(12) United States Patent
Kreutz

(10) Patent No.: US 8,122,655 B2
(45) Date of Patent: Feb. 28, 2012

(54) FRAME AND METHOD OF COMPRISING ONE OR MORE ELASTIC MODULES FOR CABLE ENTRIES, PIPE PENETRATIONS OR THE LIKE

(75) Inventor: Tomas Kreutz, Lyckeby (SE)

(73) Assignee: Roxtec AB, Karlskrona (SE)

( * ) Notice: Subject to any disclaimer, the term of this patent is extended or adjusted under 35 U.S.C. 154(b) by 698 days.

(21) Appl. No.: 11/667,522

(22) PCT Filed: Dec. 6, 2005

(86) PCT No.: PCT/SE2005/001840
§ 371 (c)(1),
(2), (4) Date: Jan. 15, 2009

(87) PCT Pub. No.: WO2006/062469
PCT Pub. Date: Jun. 15, 2006

(65) Prior Publication Data
US 2009/0152407 A1 Jun. 18, 2009

(30) Foreign Application Priority Data
Dec. 8, 2004 (SE) ........................ 0402978

(51) Int. Cl.
*E04C 2/52* (2006.01)

(52) U.S. Cl. ............... 52/220.8; 248/49; 248/60

(58) Field of Classification Search ........... 248/27.1, 248/27.3, 49, 56, 68.1; 52/220.8; 174/36, 174/95–98, 99 R, 154–156, 158 R, 163 R, 174/174–175; 24/115 A, 129 D
See application file for complete search history.

(56) References Cited

U.S. PATENT DOCUMENTS
2,391,997 A * 1/1946 Noble ........................... 52/578
(Continued)

FOREIGN PATENT DOCUMENTS
DE    1933675    3/1966
(Continued)

OTHER PUBLICATIONS
Supplementary European Search Report for European patent application No. 05 81 3326 dated Apr. 11, 2008.

*Primary Examiner* — Amy Sterling
*Assistant Examiner* — Erin W Smith
(74) *Attorney, Agent, or Firm* — Harness, Dickey & Pierce, P.L.C.

(57) ABSTRACT

The present invention concerns a frame (1) for receiving one or more elastic modules (2) forming cable entries, pipe penetrations or the like. The frame (1) has a form automatically compressing the one or more modules (2) at mounting to an appliance (7). The compression is made in that the modules (2) are received in a central opening of the frame (1) formed by inclining walls (3) and that the overall dimension of the modules (2) received in the central opening is somewhat larger than the inner dimension of the central opening. The modules (2) protrude from the frame (1) and are therefore further compressed when the frame is mounted to the appliance (7).

10 Claims, 2 Drawing Sheets

U.S. PATENT DOCUMENTS

| | | | | |
|---|---|---|---|---|
| 3,693,664 A | * | 9/1972 | Schmunk | 138/111 |
| 3,731,448 A | * | 5/1973 | Leo | 52/592.1 |
| 5,258,572 A | * | 11/1993 | Ozeki et al. | 174/38 |
| 5,742,982 A | * | 4/1998 | Dodd et al. | 24/16 R |
| 6,102,360 A | * | 8/2000 | Clegg et al. | 248/27.1 |
| 6,149,164 A | | 11/2000 | Kreutz | |
| 2009/0218451 A1 | * | 9/2009 | Lundborg | 248/56 |

FOREIGN PATENT DOCUMENTS

| | | |
|---|---|---|
| DE | 3828012 | 3/1989 |
| DE | 29716019 | 12/1997 |
| FR | 2171531 | 9/1973 |
| FR | 2674929 | 10/1992 |
| GB | 2140114 | 11/1984 |
| SU | 1029294 | 7/1983 |

* cited by examiner

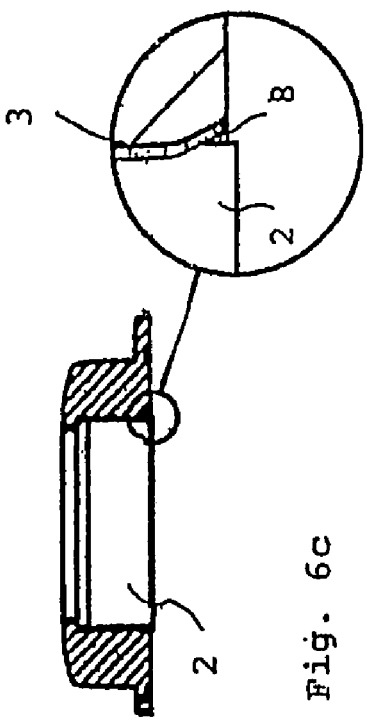
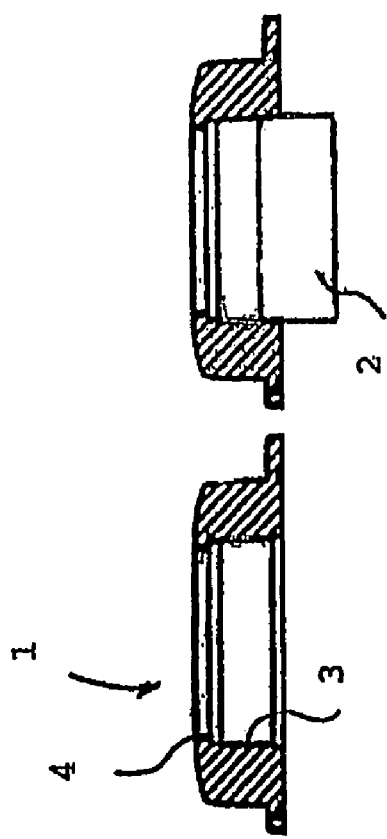
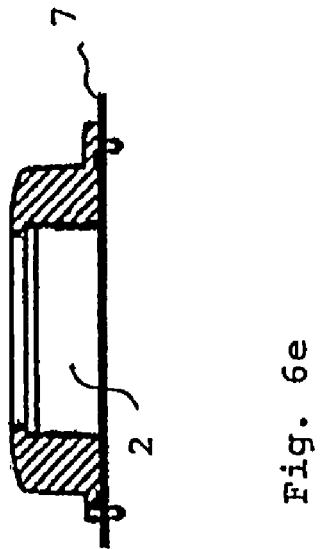
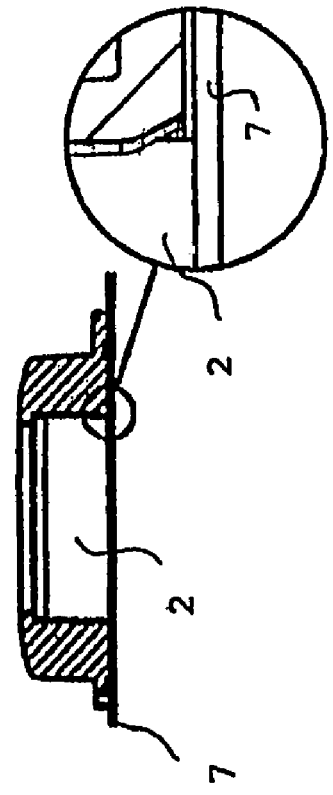
Fig. 6a
Fig. 6b
Fig. 6c
Fig. 6d
Fig. 6e

US 8,122,655 B2

FRAME AND METHOD OF COMPRISING ONE OR MORE ELASTIC MODULES FOR CABLE ENTRIES, PIPE PENETRATIONS OR THE LIKE

TECHNICAL FIELD

The present invention concerns a frame to be used in a system for cable entries, pipe penetrations etc. The invention also concerns a method of compressing elastic modules receiving cables, pipes or the like, which modules are to be received in the frame.

PRIOR ART

Known systems used to seal at cable entries, pipe penetrations etc. include a frame and elastic modules. Normally a number of cables and/or pipes are received in each frame. Thus, a number of modules or units for receiving cables and/or pipes are received in each frame. The modules surrounding the cables, pipes etc. are made of a compressible material. Systems of this kind are used in many different environments, such as for cabinets, technical shelters, junction boxes and machines. They are used in different industrial environments, such as automotive, telecom, power generation and distribution, as well as marine and offshore. The sealing systems may have to seal against fluid, gas, fire, rodents, termites, dust, moisture etc., and may receive cables for electricity, communication, computers etc. or pipes for different gases or liquids such as water, compressed air, hydraulic fluid and cooking gas.

In the known systems some kind of compression unit is used to compress the modules and to create a relatively tight seal.

SUMMARY OF THE INVENTION

The frame of the present invention is mainly intended for installations having relatively moderate demands on tightness. The present invention has been developed mainly for electrical cables, but a person skilled in the art realises that it may be used for other purposes, such as for pipes.

In many instances the demands on cable entries etc. are relatively moderate. For e.g. electrical cabinets that are placed relatively protected the demands of tightness are less stringent than for cabinets placed in harsh environments. It is not always economically justified to use the same frames and modules for cable entries for "protected" cabinets as for cabinets in harsh environments. Thus, there is a need of an inexpensive cable entry, pipe penetration etc. that still gives a watertight connection. The cable entry, pipe penetration etc. should be tight enough after assembly to hinder direct penetration of water.

The invention is based on modules needing some form of compression to give a tight sealing. Even tough the modules as an example are shown as having peelable sheets and formed to receive one round cable each, a person skilled in the art realises that the principals of the invention may be used for many types of modules and cables. Thus, several cables may be received in each module, the cables may be flat cables, the cables may be replaced by pipes, the general form of the frame does not have to be square, it may be rectangular, circular, polygonal etc. The principles of this invention could be used for many types of frames, modules and appliances.

One object of the present invention is to have a system of frame and modules for receiving cables or pipes that could be provided at a relatively low cost. One way of reducing the costs is to have a design not needing a specific compression unit. A further object is that the frame and modules should be easy to assemble and use. Still a further object is that it should be possible to use standard modules. Yet an object is that assembly of several frames in straight rows should be facilitated.

According to the present invention the modules are automatically compressed in two steps. The first compression step is when the modules are inserted in the frame and the second compression step is when the frame including the modules is fixed to an appliance.

Further objects and advantages of the present invention will be obvious for a person skilled in the art when reading the detailed description below of at present preferred embodiments.

BRIEF SUMMARY OF THE DRAWINGS

The invention will be described further by way of an example and with reference to the enclosed drawings. In the drawings:

FIGS. 6a-6e shows a number of steps for attaching a frame including one or more modules to an appliance.

DETAILED DESCRIPTION OF PREFERRED EMBODIMENTS

Figure 1:
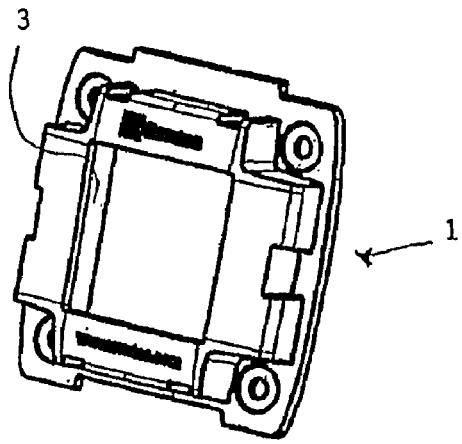
FIG. 1 shows a frame according to the present invention in perspective view.
Figure 2:
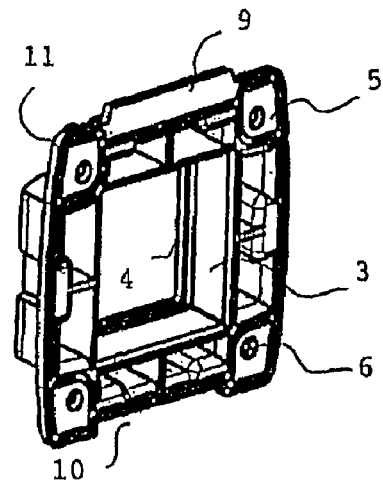
FIG. 2 shows the frame of FIG. 1 from opposite side.
Figure 3:
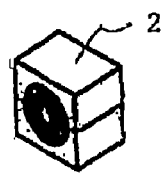
FIG. 3 shows one example of a module to be used in the frame.

The Figs. show a frame 1 to be used for cable entries at an electric cabinet 7 or the like. The frame 1 and cables received in the frame 1 should be attached to the cabinet 7 in a way to minimize the risk of intrusion of water or the like into the cabinet 7. In order to do so elastic modules 2 are used. These modules 2 receive a cable in the centre and by putting them under pressure the modules 2 will fit tightly around the cables.

In the shown example the modules 2 have a central blind bar and a number of peelable sheets. Depending on the outer dimension of the cable to be received an appropriate number of sheets are peeled off before receiving the cable. The number of sheets peeled off should not be more than enabling the module 2 to be compressed enough to give a tight sealing. This type of modules 2 is well known in the prior art.

The frame 1 has a central opening with inclined or conical walls 3. One or more modules 2, four in the shown embodiment, are to be received inside the central opening of the frame 1. Inside the central opening the modules 2 will abut against the conical inner walls 3 of the frame 1.

At the side to be facing the electrical cabinet 7 the frame 1 has a contact part 5. The contact part 5 forms a flange outside the central opening. The walls 3 forming the central opening are inclined in such away that the distance between them decreases from the contact part 5 and upwards. The walls 3 are bevelled 8 at the transition to the contact part 5. Thanks to the bevels 8 and the conical walls 3 insertion of modules 2 inside the frame 1 is facilitated. The inclination of the walls 3 is relatively small and in the order of 1°.

A stop edge 4 is arranged encircling the central opening at the end furthest from the contact part 5. The stop edge 4 hinders the modules 2 from being pushed through the central opening. The modules 2 have a height slightly larger than the height of the conical walls 3 forming the central opening of the frame 1. Furthermore, the distance between the inclined walls 3 at the stop edge 4 is slightly smaller than the outer dimension of the combined modules 2 received in the frame 1. Thus, after insertion in the frame 1 the inclining walls 3 will compress the modules 2 and the modules 2 will extend a short distance below the contact part 5, formed by the flange of the frame 1.

A gasket or seal 11 is integrated in the frame 1. The seal 11 goes along the sides of the contact part 5 and forms a ring around each part to receive a screw or other fixation means. In the shown example the seal 11 goes along the outer edge of the recess 10 but at a distance from the edge of the protruding part 9 of the frame 1. The frame 1 and seal 11 may be formed in a single forming or moulding process, even tough they normally are made of different materials. In other embodiments the seal is a discrete part either attached to the frame 1 in a suitable way, e.g. by gluing, or laid lose between the frame 1 and the appliance to which the frame 1 is to be fixed.

Figure 4:
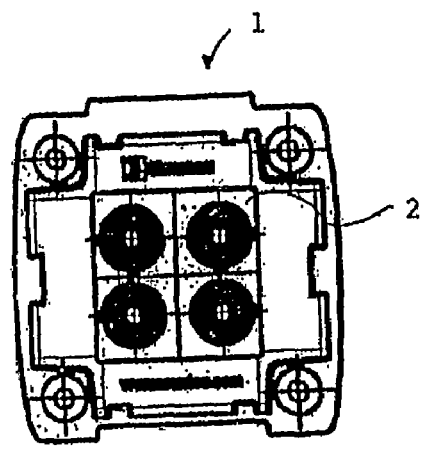
FIG. 4 shows a plan view of the frame of FIGS. 1 and 2 receiving a number of the modules of FIG. 3.

In the shown example of FIG. 4 the frame 1 receives four modules 2. A person skilled in the art realises that depending on the dimensions of the frame and the modules a frame may receive any number of modules. As an example, in a further embodiment (not shown) nine modules are received in the frame 1.

Figure 5:
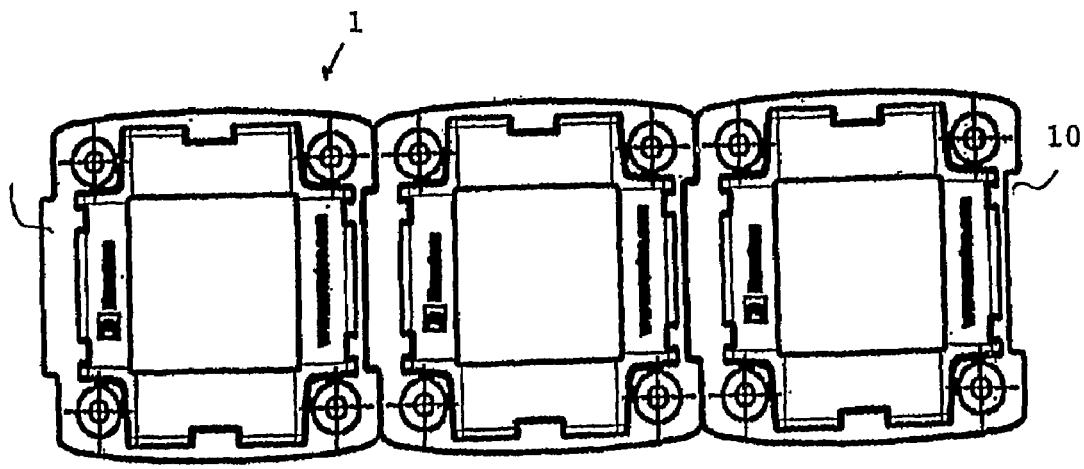
FIG. 5 shows a plan view of frames mounted in a straight row.

The frames 1 are given a form to simplify mounting of several frames 1 adjacent each other, in a straight row as indicated in FIG. 5. One side of each flange has a protruding part 9 while the opposite side has a recess 10. By placing the protruding part 9 of one frame 1 inside the recess 10 of an adjacent frame 1 a number of frames 1 may easily be placed in a straight row.

In FIG. 6 an example of attaching the frame 1 including a module 2 to an electrical cabinet is shown in several steps. To simplify the drawings the frame 1 and module 2 are shown without any cables. Even tough only one module 2 is shown in this example a person skilled in the art realises that the same principles apply if a larger number of modules 2 are being used. Normally the module 2 is first adapted to the cable to be received and the module 2 is inserted in the frame 1 with the cable attached. (FIGS. 6a and 6b) The module 2 including cable is pressed into the central opening of the frame 1. This action is made easier in that the walls 3 are conical and bevelled 8 at the contact part 5, i.e. at the side from which the module is inserted. In order for the module 2 to be compressed, as wanted, the inner dimension of the central opening should be slightly smaller than the total outer dimension of the module 2, or all modules 2 combined if several modules 2 are used. The module 2 is pressed into the frame 1 until it hit the stop edge 4, placed inside the central opening, furthest from the contact part 5. The height of the walls 3 forming the central opening of the frame 1 is somewhat smaller than the height of the module 2. Thus, the module 2 will extend a short distance below the frame 1 after being pressed against the stop edge 4. The amount of extension for the module is in the order of 0.4 mm. (FIG. 6c) Finally, the frame 1 is fixed to the electrical cabinet, usually by means of screws received in holes 6 in the contact part 5 of the frame 1. Since the modules 2 extend below the contact part 5 before attachment, the module 2 will be compressed further by the attachment to the electrical cabinet 7. (FIGS. 6d and 6e)

The difference in dimensions between the modules 2 and the central opening of the frame 1 should be large enough to compress the modules 2 and still make it possible to insert the modules by hand into the central opening of the frame 1. Even tough the modules 2 normally are inserted into the frame by hand it is also possible to use mechanical means for the insertion.

The modules 2 automatically become compressed in the frame 1 at attachment to an electrical cabinet 7 or other appliance. Thus, the cables are received tightly, reducing the risk of water penetration. To enhance the sealing effect a seal 11 is integrated in the contact part 5 of the frame 1, as indicated above.

Even though the invention is described above in connection with cable entries at an electrical cabinet, a person skilled in the art realises that the frame 1 may be used for attachment to any appliance. Furthermore, a person skilled in the art realises that the frame 1 and modules 2 may also be used for pipe penetrations, or a combination of cable entries and pipe penetrations attached to any type of appliance.

The invention claimed is:

1. A frame for receiving one or more elastic modules forming cable entries or pipe penetrations, the frame comprising:
a form configured to automatically compress the one or more modules at mounting of the frame to an appliance, the frame including conical interior side walls, forming a central opening, wherein the frame has a contact part at a base end of the side walls, to be attached to the appliance, wherein a stop edge is placed encircling the central opening at an end of the interior side walls furthest from the contact part, wherein said stop edge has a dimension hindering the one or more modules to pass the stop edge and wherein the height of the modules is bigger than the height of the side walls forming the central opening of the frame.

2. The frame of claim 1, wherein the frame is bevelled at a transition between the conical side walls and the contact part.

3. The frame of claim 2, wherein the conical side walls extend from the contact part and the distance between the side walls decreases directed away from the contact part.

4. The frame of claim 2, wherein inner dimensions of the central opening of the frame is smaller than total outer dimensions of all the modules to be received inside the central opening of the frame.

5. The frame of claim 1, wherein four modules are received in the frame.

6. The frame of claim 1, wherein nine modules are received in the frame.

7. The frame of claim 1, wherein each module is adaptable to at least one of a cable and pipe to be received.

8. The frame of claim 2, wherein the contact part forms a flange having a protruding part on one side of the frame to be received in a recess of the opposite side of the flange of an adjacent frame and a seal is integrated with the frame going along the circumference of the contact part.

9. The frame of claim 1, wherein the appliance is an electrical cabinet.

10. A method of compressing one or more elastic modules for cable entries or pipe penetrations inside a frame, the method comprising:
inserting at least one module in the frame, wherein dimensions of the frame and the at least one module to be received inside the frame are such that the at least one module is automatically compressed when received inside the frame, and
further compressing the modules by mounting the frame and the inserted at least one module to an appliance, and the at least one module protrudes from the frame before mounting.

* * * * *